United States Patent
Schroeder et al.

(10) Patent No.: US 6,676,167 B2
(45) Date of Patent: Jan. 13, 2004

(54) AIR CONDITIONING BLOCK FITTING WITH TWO SURFACE SEALING

(75) Inventors: Fred Georg Schroeder, Grosse Ile, MI (US); Eric W. Kesler, Northville, MI (US); Joseph Nader, Jr., Port Sanilac, MI (US); Michael Bednarik, Novy Jicin (CZ); Frantisek Miculek, Suchdol nad Odrou (CZ); Leos Kocian, Novy Jicin (CZ)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/151,396

(22) Filed: May 20, 2002

(65) Prior Publication Data

US 2003/0214130 A1 Nov. 20, 2003

(51) Int. Cl.[7] .................................................. F16L 41/00
(52) U.S. Cl. ................ 285/205; 285/124.4; 285/124.5; 285/351; 285/368
(58) Field of Search .............................. 285/205, 124.1, 285/124.2, 124.3, 124.4, 124.5, 351

(56) References Cited

U.S. PATENT DOCUMENTS

| | | | |
|---|---|---|---|
| 2,202,492 A | 5/1940 | Jacocks | |
| 2,444,380 A | 6/1948 | Shimek | |
| 2,687,229 A | 8/1954 | Laurent | |
| 2,864,630 A | 12/1958 | Breitenstein | |
| 2,900,199 A | 8/1959 | Logan | |
| 3,524,662 A | 8/1970 | Tolman et al. | |
| 3,834,744 A | 9/1974 | Masatchi | |
| 3,929,356 A | 12/1975 | DeVincent et al. | |
| 4,214,779 A | 7/1980 | Losell | |
| 4,413,845 A | 11/1983 | Lawrence | |
| 4,452,474 A | 6/1984 | Hagner | |
| 4,648,632 A | 3/1987 | Hagner | |
| 5,156,421 A | 10/1992 | Chauvel | |
| 5,556,138 A | * 9/1996 | Nakajima et al. | ........ 285/124.4 |
| 5,681,060 A | 10/1997 | Berg et al. | |
| 6,106,030 A | 8/2000 | Nader et al. | |
| 6,161,880 A | 12/2000 | Peppel | |
| 6,189,333 B1 | 2/2001 | Cummings et al. | |
| 6,279,965 B1 | 8/2001 | Kida | |
| 6,382,678 B1 | * 5/2002 | Field et al. | ............. 285/124.1 |
| 6,386,593 B1 | 5/2002 | Slais et al. | |
| 6,398,269 B1 | * 6/2002 | Haussmann | ................ 285/365 |
| 6,443,502 B1 | * 9/2002 | Iida et al. | ................... 285/351 |
| 6,481,756 B1 | * 11/2002 | Field et al. | ............. 285/124.1 |

FOREIGN PATENT DOCUMENTS

| | | | |
|---|---|---|---|
| EP | 0 814 295 A2 | 12/1997 | |
| FR | 2694064 | * 1/1994 | ................ 285/368 |
| GB | 2 253 667 A | 9/1992 | |
| WO | WO 00/20792 | 4/2000 | |

* cited by examiner

Primary Examiner—Lynne H. Browne
Assistant Examiner—David Bochna
(74) Attorney, Agent, or Firm—Scott M. Confer (57) ABSTRACT

A block fitting for coupling tubing segments having a pair of seals, one of the seals being a radial seal and the other seal being an axial seal, wherein the fitting militates against leakage during operation of the air conditioning system upon failure of one of the pair of seals.

19 Claims, 5 Drawing Sheets

AIR CONDITIONING BLOCK FITTING WITH TWO SURFACE SEALING

FIELD OF THE INVENTION

The invention relates to a fitting for a vehicle air conditioning system and more particularly to a block fitting for coupling tubing segments, the fitting having a pair of seals wherein one of the pair of seals is a radial seal and the other of the pair of seals is an axial seal, the fitting militates against leakage during operation of the air conditioning system upon failure of one of the pair of seals.

BACKGROUND OF THE INVENTION

In assembly line manufacturing of vehicles, it is desirable that air conditioning line fittings be secured using a power nut driver rather than using a torque wrench. For this reason, peanut or block fittings are often employed.

Conventional air conditioning systems have employed block fittings having several shortcomings. The block fittings of prior art systems include restricted flow diameters in the tubing within the fitting resulting in undesirable pressure losses. Prior art fittings are typically produced from thick block material resulting in heavy and expensive fittings. Additionally, the prior art fittings are produced with a single o-ring seal. Therefore, if a surface of the tubing or seal becomes damaged, undesirable leakage of refrigerant fluid may occur.

It would be desirable to produce a fitting for use in an air conditioning system which militates against pressure loss, militates against leakage of refrigerant, and is inexpensive to produce.

SUMMARY OF THE INVENTION

Consistent and consonant with the present invention, a fitting for use in an air conditioning system which militates against pressure loss, militates against leakage of refrigerant, and is inexpensive to produce has surprisingly been discovered.

The fitting for an air conditioning system comprises:
- a male tube with an end and an outer wall, the male tube having a radially outwardly extending annular flange formed thereon and an annular groove formed in the outer wall spaced from the end and the annular flange;
- a female tube adapted to receive the male tube, the female tube having a flared end to cooperate with the male tube;
- a first o-ring disposed between the annular flange of the male tube and the flared end of the female tube to provide at least an axial seal between the male tube and the female tube;
- a second o-ring disposed within the annular groove to provide at least a radial seal between the male tube and the female tube;
- a male fitting having an aperture formed therein adapted to receive the male tube;
- a female fitting having an aperture formed therein adapted to receive the female tube; and
- fastening means for securely holding the male fitting and the female fitting adjacent one another to engage the male tube and the female tube.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DETAILED DESCRIPTION OF THE PREFERRED EMBODIMENTS

Figure 1:
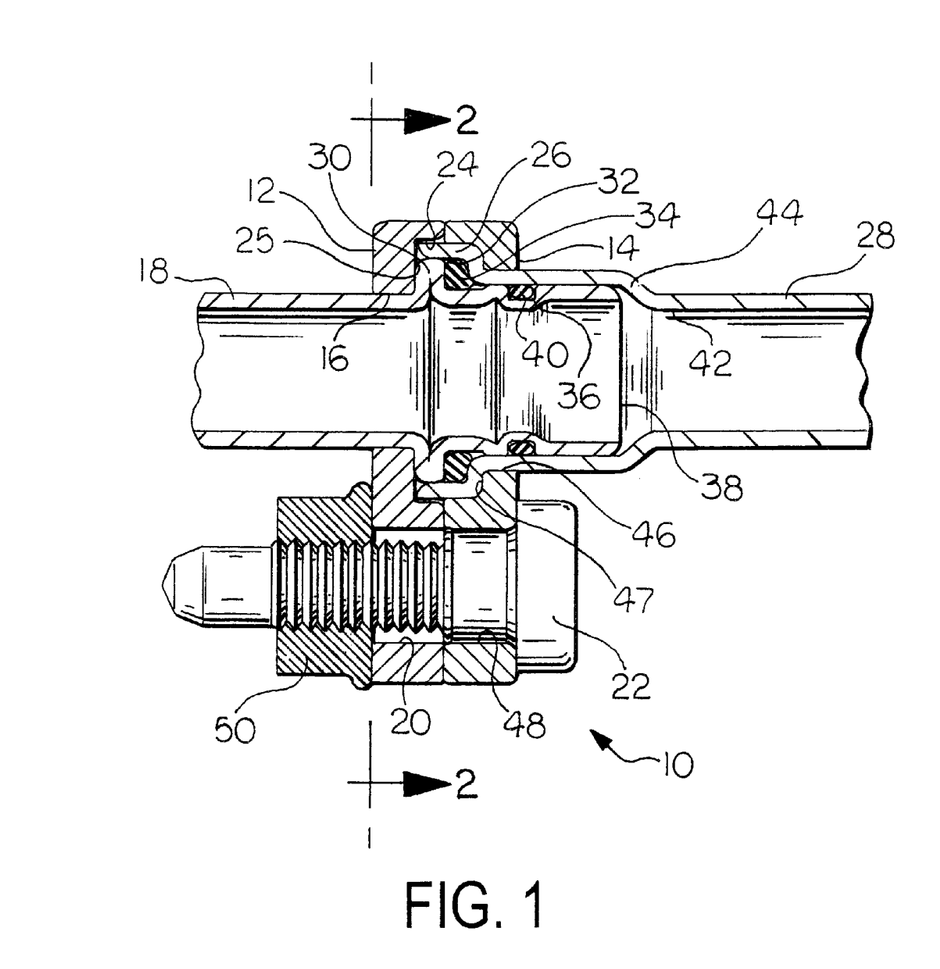
FIG. 1 is a sectional elevation view incorporating the features of the present invention.
Figure 2:
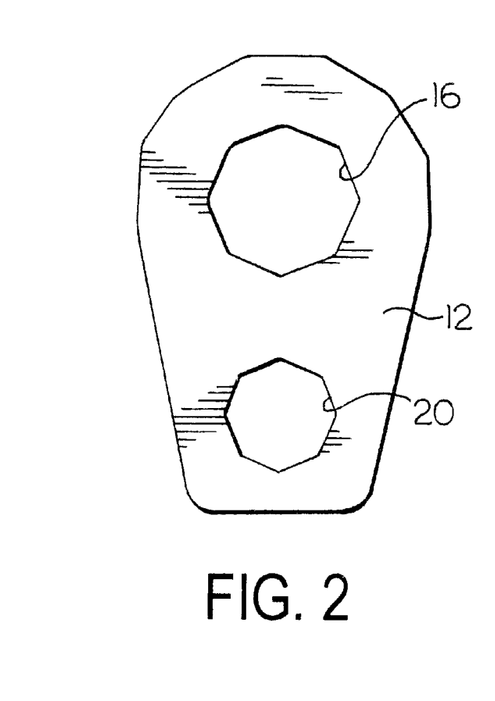
FIG. 2 is a partial sectional view taken along line 2—2 of FIG. 1 showing the male block fitting.

Referring now to the drawings, and particularly FIG. 1, there is shown generally at 10 a block or peanut fitting incorporating the features of the invention. The block fitting 10 includes a male block portion 12 and a female block portion 14. As illustrated in FIG. 2, the male block 12 has a generally elliptical shape with one end of the ellipse having a slightly smaller radius than the other end. The male block 12 includes a first generally circular aperture 16 adapted to receive a male tube or conduit 18. It is desirable, although not critical, to have a press fit between the male tube 18 and the wall forming the first aperture 16. Splines formed on the wall forming the first aperture 16 can also be used to accomplish the desired interference fit. In the embodiment shown, the first aperture 16 is disposed adjacent the end of the ellipse having the larger radius and has a center point on the major axis of the ellipse. The male block 12 includes a second generally circular aperture 20 adapted to receive a stud 22. In the embodiment shown, the second aperture 20 is disposed adjacent the end of the ellipse having the smaller radius and has a center point on the major axis of the ellipse.

An annular lip 24 is formed on one side 25 of the male block 12 and is adapted to receive an outer flared portion 26 at the end of a female tube or conduit 28. A flange 30 of the male tube 18, which may be formed by crimping, for example, abuts a side 25 of the male block 12 and an inner wall of an outer flared portion 26 of a female tube 28. A gap 32 is left between the flared portion 26 of the female tube 28 and the male tube 18 adjacent the flange 30. The gap 32 is on the side of the flange 30 opposite the side of the flange 30 which abuts the side 25 of the male block 12. A first o-ring 34 is sealingly disposed in the gap 32. An annular groove 36 is formed in the outer surface of the male tube 18, by rolling or machining, for example, near an end 38 of the male tube 18. A second o-ring 40 is disposed in the groove 36 and abuts an inner surface 42 of the female tube 28. An inner flared portion 44 of the female tube 28 is formed adjacent the end 38 of the male tube 18. Although rubber o-rings are shown in the drawings, it is understood that other conventional sealing materials could be used such as fluoroelastomers, for example.

In the embodiment shown, the female block 14 has a generally elliptical shape with one end of the ellipse having a slightly smaller radius than the other end to match the shape of the male block 12. The female block 14 includes a first generally circular aperture 46 adapted to receive the female tube 28. In the embodiment shown, the first aperture 46 is disposed adjacent the end of the ellipse having the larger radius and has a center point on the major axis of the ellipse. An annular ridge 47 surrounds the first aperture 46 of the female block 14 and abuts the outer flared portion 26 of the female tube 28. The female block 14 includes a second generally circular aperture 48 adapted to receive the stud 22. It is desirable, although not critical, to have a press fit between stud 22 and the wall forming the second aperture 48. Splines formed on the wall forming the second aperture 48 can also be used to accomplish the desired interference fit. In the embodiment shown, the second aperture 48 is disposed adjacent the end of the ellipse having the smaller radius and has a center point disposed on the major axis of the ellipse. The stud 22 is inserted through the second aperture 48 of the female block 14 and the second aperture 20 of the male block 12. A nut 50 threadingly engages the stud 22 to tightly hold the male block 12 adjacent the female block 14 and sealingly engages the male tube 18 and the female tube 28. It is understood that other fasteners could be used without departing from the scope and spirit of the invention.

Figure 3:
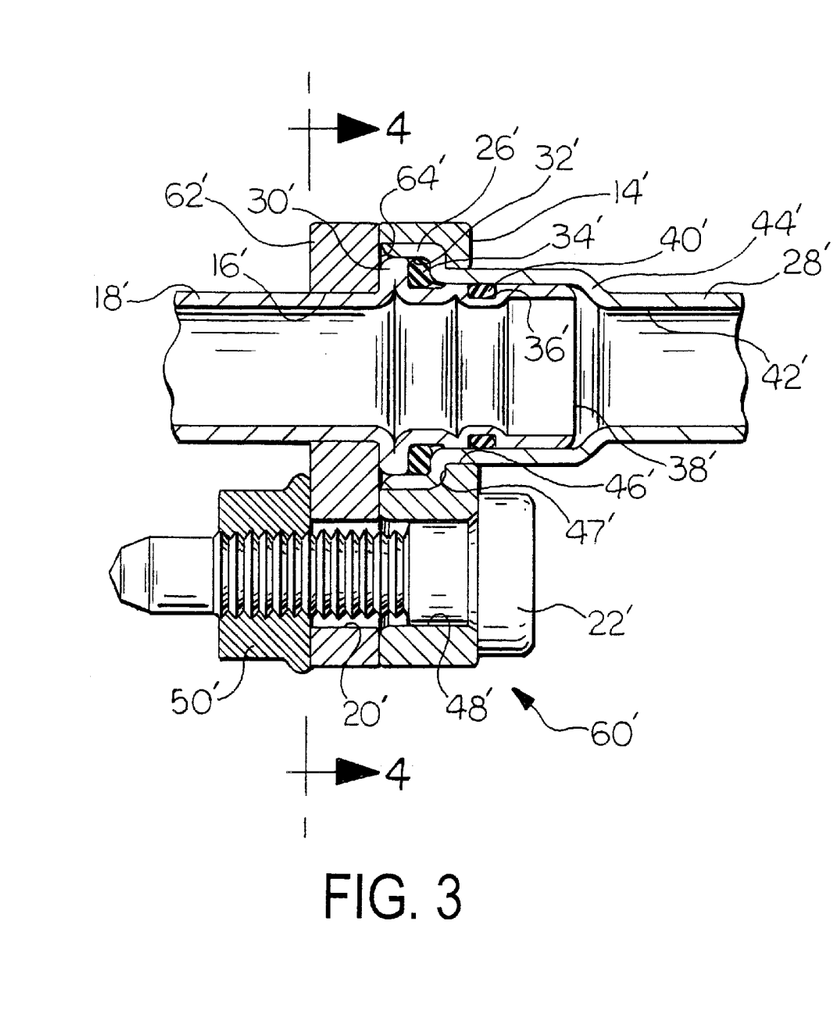
FIG. 3 is a sectional elevation view of an alternate embodiment of the present invention.
Figure 4:
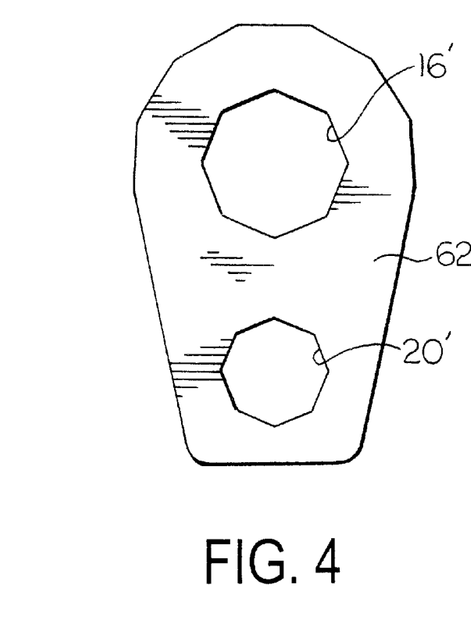
FIG. 4 is a partial sectional view taken along line 4—4 of FIG. 3 showing the male block fitting.

A second embodiment of the invention is illustrated in FIGS. 3 and 4. A block fitting 60' includes a male block portion 62' and a female block portion 14'. As illustrated in FIG. 4, the male block 62' has a generally elliptical shape with one end of the ellipse having a slightly smaller radius than the other end. The male block 62' includes a first generally circular aperture 16' adapted to receive a male tube or conduit 18'. It is desirable, although not critical, to have a press fit between the male tube 18' and the wall forming the first aperture 16'. Splines formed on the wall forming the first aperture 16' can also be used to accomplish the desired interference fit. In the embodiment shown, the first aperture 16' is disposed adjacent the end of the ellipse having the larger radius and has a center point on the major axis of the ellipse. The male block 62' includes a second generally circular aperture 20' adapted to receive a stud 22'. In the embodiment shown, the second aperture 20' is disposed adjacent the end of the ellipse having the smaller radius and has a center point on the major axis of the ellipse.

A flange 30' of the male tube 18', which may be formed by crimping, for example, abuts a side 64' of the male block 62' and an inner wall of an outer flared portion 26' of a female tube 28'. A gap 32' is left between the flared portion 26' of the female tube 28' and the male tube 18' adjacent the flange 30'. The gap 32' is on the side of the flange 30' opposite the side of the flange 30' which abuts the side 64' of the male block 62'. A first o-ring 34' is sealingly disposed in the gap 32'. An annular groove 36' is formed in an outer surface of the male tube 18', by rolling or machining, for example, near an end 38' of the male tube 18'. A second o-ring 40' is disposed in the groove 36' and abuts an inner surface 42' of the female tube 28'. An inner flared portion 44' of the female tube 28' is formed adjacent the end 38' of the male tube 18'. Although rubber o-rings are shown in the drawings, it is understood that other conventional sealing materials could be used such as fluoroelastomers, for example.

In the embodiment shown, the female block 14' has a generally elliptical shape with one end of the ellipse having a slightly smaller radius than the other end to match the shape of the male block 62'. The female block 14' includes a first generally circular aperture 46' adapted to receive the female tube 28'. In the embodiment shown, the first aperture 46' is disposed adjacent the end of the ellipse having the larger radius and has a center point on the major axis of the ellipse. An annular ridge 47' surrounds the first aperture 46' of the female block 14' and abuts the outer flared portion 26' of the female tube 28'. The female block 14' includes a second generally circular aperture 48' adapted to receive the stud 22'. It is desirable, although not critical, to have a press fit between stud 22' and the wall forming the second aperture 48'. Splines formed on the wall forming the second aperture 48' can also be used to accomplish the desired interference fit. In the embodiment shown, the second aperture 48' is disposed adjacent the end of the ellipse having the smaller radius and has a center point on the major axis of the ellipse. The stud 22' is inserted through the second aperture 48' of the female block 14' and the second aperture 20' of the male block 62'. A nut 50' threadingly engages the stud 22' to tightly hold the male block 62' adjacent the female block 14' and sealingly engages the male tube 18' and the female tube 28'. It is understood that other fasteners could be used without departing from the scope and spirit of the invention.

Figure 5:
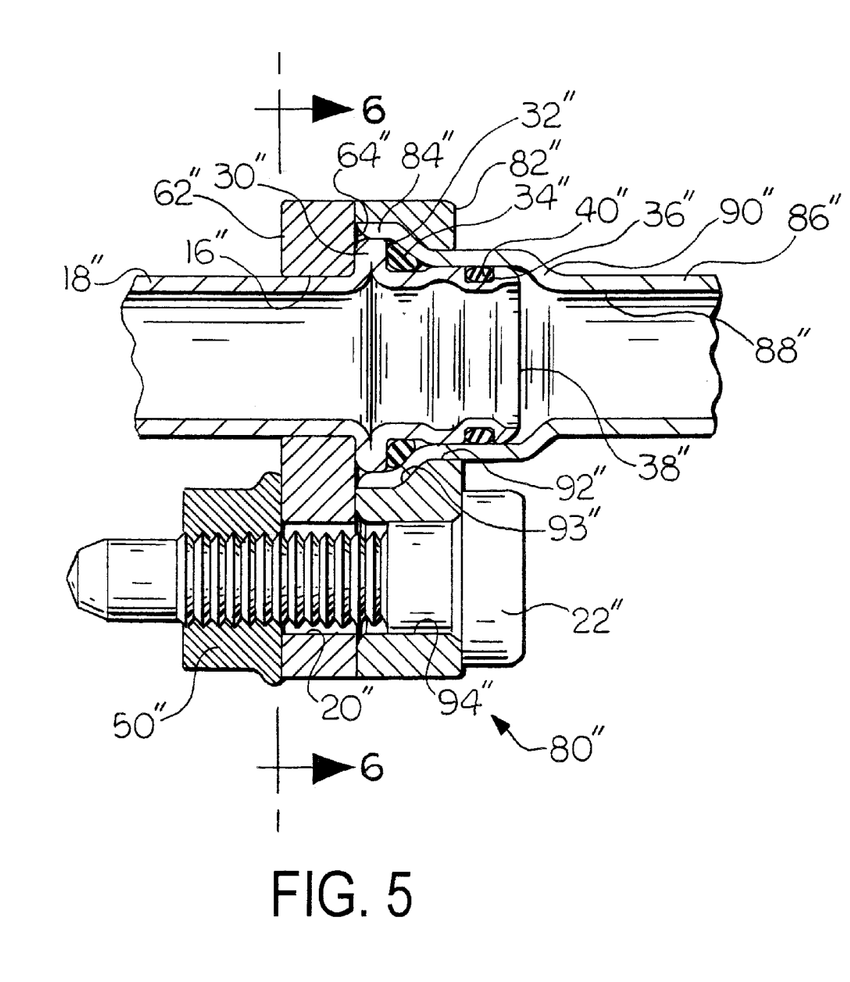
FIG. 5 is a sectional elevation view of an alternate embodiment of the present invention.
Figure 6:
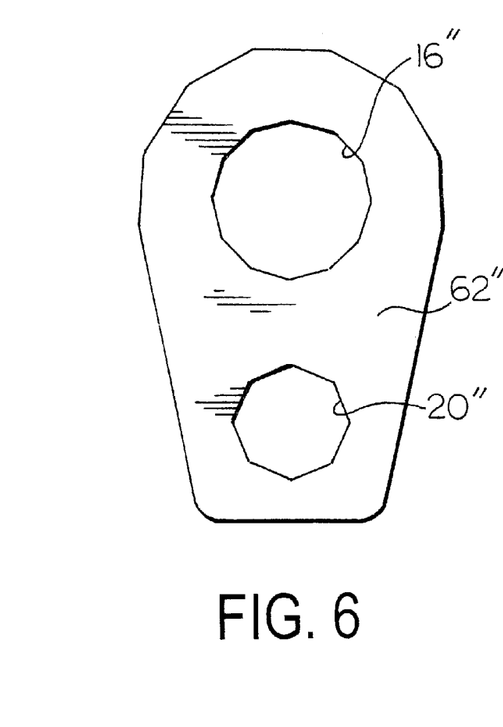
FIG. 6 is a partial sectional view taken along line 6—6 of FIG. 5 showing the male block fitting.

A third embodiment of the invention is illustrated in FIGS. 5 and 6. A block fitting 80" includes a male block portion 62" and a female block portion 82". As illustrated in FIG. 6, the male block 62" has a generally elliptical shape with one end of the ellipse having a slightly smaller radius than the other end. The male block 62" includes a first generally circular aperture 16" adapted to receive a male tube or conduit 18". It is desirable, although not critical, to have a press fit between the male tube 18" and the wall forming the first aperture 16". Splines formed on the wall forming the first aperture 16" can also be used to accomplish the desired interference fit. In the embodiment shown, the first aperture 16" is disposed adjacent the end of the ellipse having the larger radius and has a center point on the major axis of the ellipse. The male block 62" includes a second generally circular aperture 20" adapted to receive a stud 22". In the embodiment shown, the second aperture 20" is disposed adjacent the end of the ellipse having the smaller radius and has a center point on the major axis of the ellipse.

A flange 30" of the male tube 18", which may be formed by crimping, for example, abuts a side 64" of the male block 62" and an inner wall of an outer flared portion 84" of a female tube 86". A gap 32" is left between the flared portion 84" of the female tube 86" and the male tube 18" adjacent the flange 30". The gap 32" is on the side of the flange 30" opposite the side of the flange 30" which abuts the side 64" of the male block 62". A first o-ring 34" is sealingly disposed in the gap 32". An annular groove 36" is formed in an outer surface of the male tube 18", by rolling or machining, for example, near an end 38" of the male tube 18". A second o-ring 40" is disposed in the groove 36" and abuts an inner surface 88" of the female tube 86". An inner flared portion 90" of the female tube 86" is formed adjacent the end 38" of the male tube 18". Although rubber o-rings are shown in the drawings, it is understood that other conventional sealing materials could be used such as fluoroelastomers, for example.

In the embodiment shown, the female block 82" has a generally elliptical shape with one end of the ellipse having a slightly smaller radius than the other end to match the shape of the male block 62". The female block 82" includes a first generally circular aperture 92" adapted to receive the female tube 86". In the embodiment shown, the first aperture 92" is disposed adjacent the end of the ellipse having the larger radius and has a center point on the major axis of the ellipse. An annular sloped portion 93" surrounds the first aperture 92" of the female block 82" and abuts the outer flared portion 84" of the female tube 86". The female block 82" includes a second generally circular aperture 94" adapted to receive the stud 22". It is desirable, although not critical, to have a press fit between stud 22' and the wall forming the second aperture 94". Splines formed on the wall forming the second aperture 94" can also be used to accomplish the desired interference fit. In the embodiment shown, the second aperture 94" is disposed adjacent the end of the ellipse having the smaller radius and has a center point on the major axis of the ellipse. The stud 22" is inserted through the second aperture 94" of the female block 82" and the second aperture 20" of the male block 62". A nut 50" threadingly engages the stud 22" to tightly hold the male block 62" adjacent the female block 82" and sealingly engages the male tube 18" and the female tube 86". It is understood that other fasteners could be used without departing from the scope and spirit of the invention.

Figure 7:
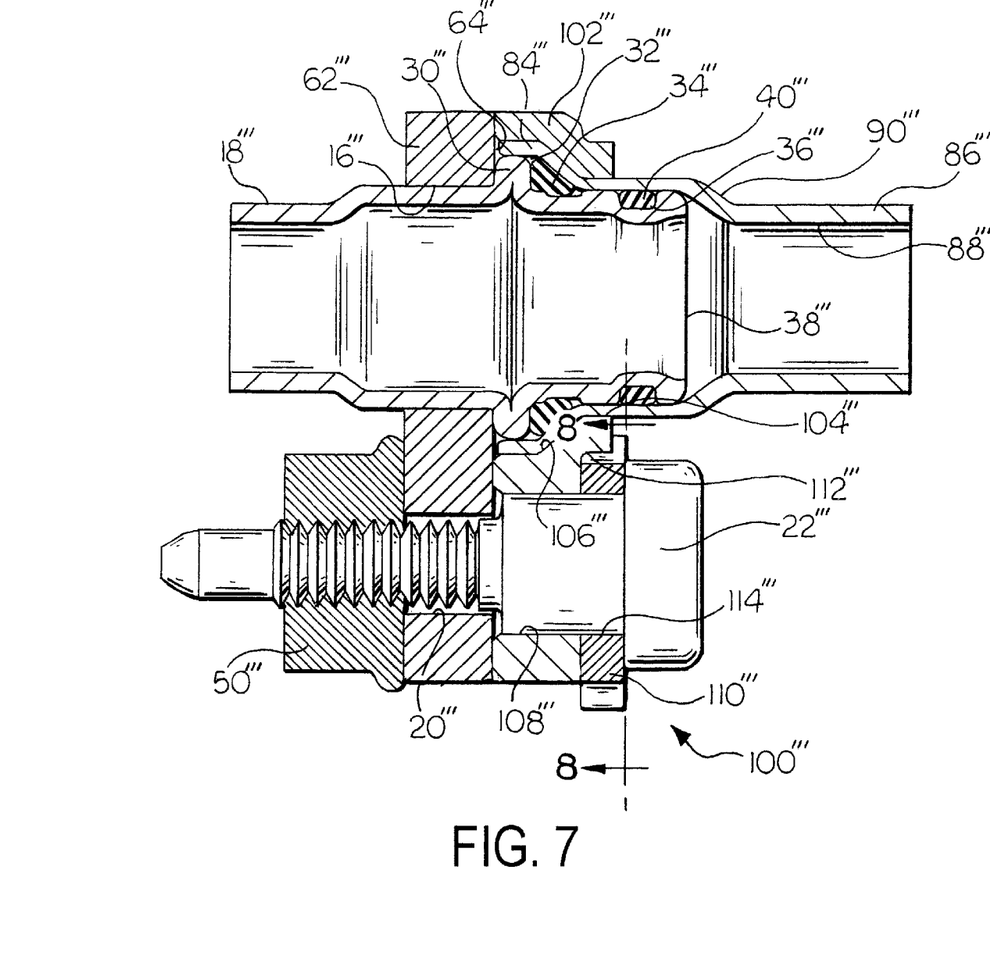
FIG. 7 is a sectional elevation view of an alternate embodiment of the present invention.
Figure 8:
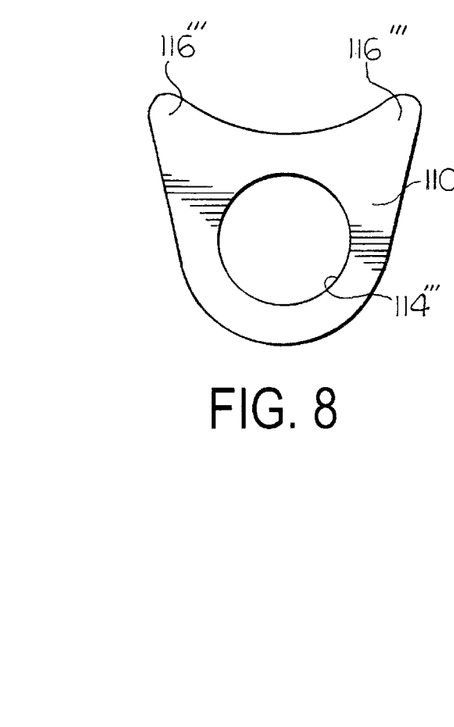
FIG. 8 is a partial sectional view taken along line 8—8 of FIG. 7 showing the backer plate.

A fourth embodiment of the invention is illustrated in FIGS. 7 and 8. A block fitting 100''' includes a male block portion 62''' and a female block portion 102'''. The male block 62''' has a generally elliptical shape with one end of the ellipse having a slightly smaller radius than the other end. The male block 62''' includes a first generally circular aperture 16''' adapted to receive a male tube or conduit 18'''. It is desirable, although not critical, to have a press fit between the male tube 18''' and the wall forming the first aperture 16'''. Splines formed on the wall forming the first aperture 16''' can also be used to accomplish the desired interference fit. In the embodiment shown, the first aperture 16''' is disposed adjacent the end of the ellipse having the larger radius and has a center point on the major axis of the ellipse. The male block 62''' includes a second generally circular aperture 20''' adapted to receive a stud 22'''. In the embodiment shown, the second aperture 20''' is disposed adjacent the end of the ellipse having the smaller radius and has a center point on the major axis of the ellipse.

A flange 30''' of the male tube 18''', which may be formed by crimping, for example, abuts a side 64''' of the male block 62''' and an inner wall of an outer flared portion 84''' of a female tube 86'''. A gap 32''' is left between the flared portion 84''' of the female tube 86''' and the male tube 18''' adjacent the flange 30'''. The gap 32''' is on the side of the flange 30''' opposite the side of the flange 30''' which abuts the side 64''' of the male block 62'''. A first o-ring 34''' is sealingly disposed in the gap 32'''. An annular groove 36''' is formed in an outer surface of the male tube 18''', by rolling or machining, for example, near an end 38''' of the male tube 18'''. A second o-ring 40''' is disposed in the groove 36''' and abuts an inner surface 88''' of the female tube 86'''. An inner flared portion 90''' of the female tube 86''' is formed adjacent the end 38''' of the male tube 18'''. Although rubber o-rings are shown in the drawings, it is understood that other conventional sealing materials could be used such as fluoroelastomers, for example.

In the embodiment shown, the female block 102''' has a generally elliptical shape with one end of the ellipse having a slightly smaller radius than the other end to match the shape of the male block 62'''. The female block 102''' includes a first generally circular aperture 104''' adapted to receive the female tube 86'''. In the embodiment shown, the first aperture 104''' is disposed adjacent the end of the ellipse having the larger radius and has a center point on the major axis of the ellipse. An annular sloped portion 106''' surrounds the first aperture 104''' of the female block 102''' and abuts the outer flared portion 84''' of the female tube 86'''. The female block 102''' includes a second generally circular aperture 108''' adapted to receive the stud 22'''. It is desirable, although not critical, to have a press fit between stud 22''' and the wall forming the second aperture 108'''. Splines formed on the wall forming the second aperture 108''' can also be used to accomplish the desired interference fit. In the embodiment shown, the second aperture 108''' is disposed adjacent the end of the ellipse having the smaller radius and has a center point on the major axis of the ellipse.

A backer plate 110''' is disposed adjacent the female block 102''' in a cutout portion 112''' of the female block 102'''. As illustrated in FIG. 8, the backer plate includes a central aperture 114''' adapted to receive the stud 22'''. The backer plate 110''' also includes a pair of shoulder portions 116'''. The stud 22''' is inserted through the aperture 114''' of the backer plate 110''', the second aperture 108''' of the female block 102''', and the second aperture 20''' of the male block 62'''. A nut 50''' threadingly engages the stud 22''' to tightly hold the male block 62''' adjacent the female block 102''' and the female block 102''' adjacent the backer plate 110'''. The nut 50''' and the stud 22''' cooperate to sealingly engage the male tube 18''' and the female tube 86'''. It is understood that other fasteners could be used without departing from the scope and spirit of the invention.

Figure 9:
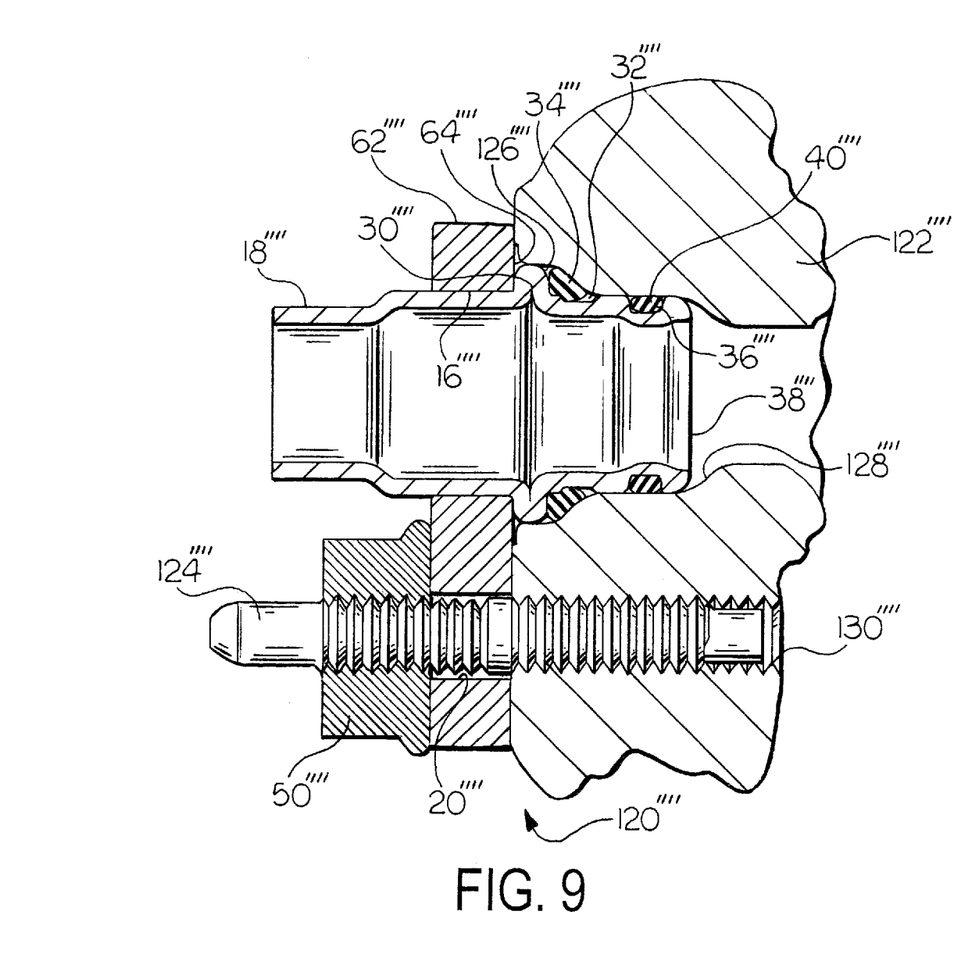
FIG. 9 is a sectional elevation view of an alternate embodiment of the present invention.

A fifth embodiment of the invention is illustrated in FIG. 9. A block fitting 120'''' includes a male block portion 62'''' and a component block portion 122'''' The component block 122'''' is a refrigerant system component such as a condenser block or compressor manifold, for example. The male block 62'''' has a generally elliptical shape with one end of the ellipse having a slightly smaller radius than the other end. The male block 62'''' includes a first generally circular aperture 16'''' adapted to receive a male tube or conduit 18''''. It is desirable, although not critical, to have a press fit between the male tube 18'''' and the wall forming the first aperture 16''''. Splines formed on the wall forming the first aperture 16'''' can also be used to accomplish the desired interference fit. In the embodiment shown, the first aperture 16'''' is disposed adjacent the end of the ellipse having the larger radius and has a center point on the major axis of the ellipse. The male block 62'''' includes a second generally circular aperture 20'''' adapted to receive a threaded stud 124''''. In the embodiment shown, the second aperture 20'''' is disposed adjacent the end of the ellipse having the smaller radius and has a center point on the major axis of the ellipse.

A flange 30'''' of the male tube 18'''', which may be formed by crimping, for example, abuts a side 64'''' of the male block 62'''' and an inner wall 126'''' of the component block 122''''. The inner wall 126'''' is adapted to receive the male tube 18''''. A gap 32'''' is left between the inner wall 126'''' and the male tube 18'''' adjacent the flange 30''''. The gap 32'''' is on the side of the flange 30'''' opposite the side of the flange 30'''' which abuts the side 64'''' of the male block 62''''. A first o-ring 34'''' is sealingly disposed in the gap 32''''. An annular groove 36'''' is formed in an outer surface of the male tube 18'''', by rolling or machining, for example, near an end 38'''' of the male tube 18''''. A second o-ring 40'''' is disposed in the groove 36'''' and abuts the inner wall 126'''' of the component block 122''''. An inner flared portion 128'''' of the component block 122'''' is formed adjacent the end 38'''' of the male tube 18''''. Although rubber o-rings are shown in the drawings, it is understood that other conventional sealing materials could be used such as fluoroelastomers, for example.

The component block 122'''' includes an aperture 30'''' adapted to receive the stud 124''''. In the embodiment shown, the aperture 130'''' threadingly engages the stud 124''''. It is understood that ther fasteners could be used without departing from the scope and spirit of the invention. The stud 124""' is inserted through the second aperture 20""' of the male block 62""'. A nut 50""' threadingly engages the stud 124""' to tightly hold the male block 62""' adjacent the component block 122""' and sealingly engages the male tube 18""' with the inner wall 126""' using the first o-ring 34""' and the second o-ring 40""'.

The assembly and operation of the embodiments of the invention will now be described. To assemble the embodiment of the invention illustrated in FIG. 1, the male tube 18 is inserted in the first aperture 16 of the male block 12. The female tube 28 is inserted in the first aperture 46 of the female block 14. The first o-ring ring 34 and the second o-ring 40 are placed on the male tube 18 in the orientation shown in FIG. 1. The male tube 18 is then inserted into the female tube 28 and the male block 12 and the female block 14 are moved adjacent one another. Then, the stud 22 is inserted into the second aperture 48 of the female block 14 and through the second aperture 20 of the male block 12. The nut 50 is then engaged with the threaded portion of the stud 22 and tightened to sealing engage the male tube 18 and the female tube 28.

Once assembled, the male block 12 and the female block 14 cooperate to create a sealed, tight fit between the male tube 18 and the female tube 28 and preclude relative axial and rotational movement between the male tube 18 and the female tube 28. The first o-ring 34 and second o-ring 40 provide a seal on two different surfaces. The first o-ring 34 provides an axial seal on the flange 30 of the male tube 18. The second o-ring 40 provides a radial seal between the annular groove 36 of the male tube 18 and the inner wall 42 of the female tube 28. The two surface sealing provides redundant sealing which safeguards against leakage should one of the seals or the sealing surfaces be damaged. Additionally, the seal and tube arrangements allow the inner diameter through the block fitting 10 to remain substantially the same as the inner diameter of the male tube 18 and the female tube 28, thereby minimizing frictional losses in fluid flow through the connection.

To assemble the second embodiment of the invention illustrated in FIG. 3, the male tube 18' is inserted in the first aperture 16' of the male block 62'. The female tube 28' is inserted in the first aperture 46' of the female block 14'. The first o-ring 34' and the second o-ring 40' are placed on the male tube 18' in the orientation shown in FIG. 3. The male tube 18' is then inserted into the female tube 28' and the male block 62' and the female block 14' are moved adjacent one another. Then, the stud 22' is inserted into the second aperture 48' of the female block 14' and through the second aperture 20' of the male block 62'. The nut 50' is then engaged with the threaded portion of the stud 22' and tightened to sealing engage the male tube 18' and the female tube 28'.

Once assembled, the male block 62' and the female block 14' cooperate to create a sealed, tight fit between the male tube 18' and the female tube 28' and preclude relative axial and rotational movement between the male tube 18' and the female tube 28'. The first o-ring 34' and second o-ring 40' provide a seal on two different surfaces. The first o-ring 34' provides an axial seal on the flange 30' of the male tube 18'. The second o-ring 40' provides a radial seal between the annular groove 36' of the male tube 18' and the inner wall 42' of the female tube 28'. The two surface sealing provides redundant sealing which safeguards against leakage should one of the seals or the sealing surfaces be damaged. Additionally, the seal and tube arrangements allow the inner diameter through the block fitting 60' to remain substantially the same as the inner diameter of the male tube 18' and the female tube 28', thereby minimizing frictional losses in fluid flow through the connection. In this embodiment, the end of the female tube 28' is protected against damage as it does not protrude beyond the edge of the female block 14' facing the male block 62'.

To assemble the third embodiment of the invention illustrated in FIG. 5, the male tube 18" is inserted in the first aperture 16" of the male block 62". The female tube 86" is inserted in the first aperture 92" of the female block 82". The first o-ring 34" and the second o-ring 40" are placed on the male tube 18" in the orientation shown in FIG. 5. The male tube 18" is then inserted into the female tube 86" and the male block 62" and the female block 82" are moved adjacent one another. Then, the stud 22" is inserted into the second aperture 94" of the female block 82" and through the second aperture 20" of the male block 62". The nut 50" is then engaged with the threaded portion of the stud 22" and tightened to sealing engage the male tube 18" and the female tube 86".

Once assembled, the male block 62" and the female block 82" cooperate to create a sealed, tight fit between the male tube 18" and the female tube 86" and preclude relative axial and rotational movement between the male tube 18" and the female tube 86". The first o-ring 34" and second o-ring 40" provide a seal on two different surfaces. The first o-ring 34" provides an axial seal on the flange 30" of the male tube 18", as well as axial and radial seals on the sloped portion of the outer flared portion 84" of the female tube 86". The second o-ring 40" provides a radial seal between the annular groove 36" of the male tube 18" and the inner wall 88" of the female tube 86". The two surface sealing provides redundant sealing which safeguards against leakage should one of the seals or the sealing surfaces be damaged. Additionally, the seal and tube arrangements allow the inner diameter through the block fitting 80" to remain substantially the same as the inner diameter of the male tube 18" and the female tube 86", thereby minimizing frictional losses in fluid flow through the connection. In this embodiment, the end of the female tube 86" is protected against damage as it does not protrude beyond the edge of the female block 82" facing the male block 62".

To assemble the fourth embodiment of the invention illustrated in FIG. 7, the male tube 18'" is inserted in the first aperture 16'" of the male block 62'". The female tube 86'" is inserted in the first aperture 104'" of the female block 102'". The first o-ring 34'" and the second o-ring 40'" are placed on the male tube 18'" in the orientation shown in FIG. 7. The male tube 18'" is then inserted into the female tube 86'" and the male block 62'" and the female block 102'" are moved adjacent one another. Then, the stud 22'" is inserted into the aperture of the backer plate 110'", the second aperture 108'" of the female block 102'", and through the second aperture 20'" of the male block 62". The nut 50'" is then engaged with the threaded portion of the stud 22'" and tightened to sealing engage the male tube 18'" and the female tube 86'".

Once assembled, the male block 62'" and the female block 102'" cooperate to create a sealed, tight fit between the male tube 18'" and the female tube 86'" and preclude relative axial and rotational movement between the male tube 18'" and the female tube 86'". Additionally, the backer plate 110'" provides additional support and stiffening for the female block 102'" to militate against leakage. The first o-ring 34'" and second o-ring 40'" provide a seal on two different surfaces. The first o-ring 34'" provides an axial seal on the flange 30'" of the male tube 18'", as well as axial and radial seals on the sloped portion of the outer flared portion 84'" of the female tube 86'''. The second o-ring 40''' provides a radial seal between the annular groove 36''' of the male tube 18''' and the inner wall 88''' of the female tube 86'''. The two surface sealing provides redundant sealing which safeguards against leakage should one of the seals or the sealing surfaces be damaged. Additionally, the seal and tube arrangements allow the inner diameter through the block fitting 100''' to remain substantially the same as the inner diameter of the male tube 18''' and the female tube 86''', thereby minimizing frictional losses in fluid flow through the connection. In this embodiment, the end of the female tube 86''' is protected against damage as it does not protrude beyond the edge of the female block 102''' facing the male block 62'''.

To assemble the fifth embodiment of the invention illustrated in FIG. 9, the male tube 18'''' is inserted in the first aperture 16'''' of the male block 62''''. The first o-ring 34'''' and the second o-ring 40'''' are placed on the male tube 18'''' in the orientation shown in FIG. 9. The stud 124'''' is threaded into the aperture 130'''' of the component block 122''''. The male tube 18'''' is then inserted into the component block 122'''' adjacent the inner wall 126''''. Concurrently, the stud 124'''' is inserted into the second aperture 20'''' of the male block 62''''. The nut 50'''' is then engaged with the threaded portion of the stud 12'''' and tightened to sealing engage the male tube 18'''' with the inner wall 126'''' of the component block 122'''' using the first o-ring 34'''' and the second o-ring 40''''.

Once assembled, the male block 62'''' and the component block 122'''' cooperate to create a sealed, tight fit and preclude relative axial and rotational movement between the male tube 18'''' and the component block 122''''. The first o-ring 3'''' and second o-ring ring 40'''' provide a seal on two different surfaces. The first o-ring 34'''' provides an axial seal on the flange 30'''' of the male tube 18'''', as well as axial and radial seals on a sloped portion of the inner wall 126''''. The second o-ring 40'''' provides a radial seal between the annular groove 36'''' of the male tube 18'''' and the inner wall 126''''. The two surface sealing provides redundant sealing which safeguards against leakage should one of the seals or the sealing surfaces be damaged. Additionally, the seal and tube arrangement allows the inner diameter through the block fitting 120'''' to remain substantially the same as the inner diameter of the male tube 18'''' thereby minimizing frictional losses in fluid flow through the connection.

By using the configurations illustrated in the drawings, the thickness of the male blocks and the female blocks are also minimized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fitting for coupling tubing segments comprising:
   a male tube with an end and an outer wall, said male tube having a radially outwardly extending annular flange formed thereon and an annular groove formed in the outer wall spaced from the end and the annular flange;
   a female tube adapted to receive said male tube, said female tube having a flared-portion adjacent a first end thereof to cooperate with said male tube;
   a first o-ring disposed between the annular flange of said male tube and the flared portion of said female tube to provide at least an axial seal between said male tube and said female tube, said first o-ring spaced from the first end of said female tube;
   a second o-ring disposed within the annular groove to provide at least a radial seal between said male tube and said female tube;
   a male fitting having an aperture formed therein adapted to receive said male tube;
   a female fitting having an aperture formed therein adapted to receive said female tube; and
   fastening means for securely holding said male fitting and said female fitting adjacent one another to engage said male tube and said female tube.

2. The fitting according to clam 1, wherein the first o-ring provides both an axial seal and a radial seal between said male tube and said female tube.

3. The fitting according to claim 1, wherein said fastening means is a threaded stud and a nut.

4. The fitting according to claim 1, wherein an inner diameter of said male tube within said male fitting and said female fitting is substantially the same as an inner diameter of said male tube outside of said male fitting and said female fitting.

5. The fitting according to claim 1, wherein an inner diameter of said male tube within said male fitting and said female fitting is substantially the same as an inner diameter of said female tube outside of said male fitting and said female fitting.

6. The fitting according to claim 1, when said male fitting is a block type fitting.

7. The fitting according to clam 1, wherein said female fitting is a block type fitting.

8. The fitting according to claim 1, including a backer plate mounted adjacent said female fitting on a side opposite said male fitting.

9. A block fitting for coupling a male tubing segment and a female tubing segment for an air conditioning system comprising:
   a male tube with an end and an outer wall, said male tube having a radially outwardly extending annular flange formed thereon and an annular groove formed in the outer wall spaced from the end and the annular flange;
   a female tube adapted to receive said male tube, said female tube having a flared end to cooperate with said male tube;
   a first o-ring disposed between the annular flange of said male tube and the flared end of said female tube to provide at least an axial seal between said male tube and said female tube, wherein said first o-ring is disposed entirely within said female tube;
   a second o-ring disposed within the annular groove to provide at least a radial seal between said male tube and said female tube;
   a male block fitting having an aperture formed therein adapted to receive said male tube, said male block abutting the annular flange on a side opposite the end of said male tube and hat a press fit between the aperture and the outer wall of said male tube;
   a female block fitting having an aperture formed therein adapted to receive said female tube, said female block having an annular ridge abutting the flared end of said female tube; and
   fastening means for securely holding said male block fitting and said female block fitting adjacent one another to engage said male tube and said female tube.

10. The fitting according to claim 9, wherein the first o-ring provides both an axial seal and a radial seal between said male tube and said female tube.

11. The fitting according to claim 9, wherein said fastening means is a threaded stud and a nut.

12. The fitting according to claim 9, wherein an inner diameter of said male tube within said male block and said female block is substantially the same as an inner diameter of said male tube outside of said male block and said female block.

13. The fitting according to claim 9, wherein an inner diameter of said male tube within said male block and said female block is substantially the same as an inner diameter of said female tube outside of said male block and said female block.

14. The fitting according to claim 9, including a backer plate mounted adjacent said female block on a side opposite said male block.

15. A block fitting for coupling a male tubing segment and a component block for an air conditioning system comprising:
  a male tube with an end and an outer wall, said male tube having a radially outwardly extending annular flange formed thereon and an annular groove formed in the outer wall spaced from the end and the annular flange;
  a component block having a first aperture formed therein adapted to receive said male tube, an inner surface of said component block which forms the first aperture having a flared shape to cooperate with said male tube, said component block having a second aperture formed therein;
  a first o-ring disposed between the annular flange of said male tube and the inner surface of said component block to provide at least an axial seal between said male tube and the inner surface of said component block, wherein said first o-ring is disposed entirely within the first aperture of said component block;
  a second o-ring disposed within the annular groove to provide at least a radial seal between said male tube and the inner surface of said component block;
  a male block fitting having a first aperture formed therein adapted to receive said male tube, said male block abutting the annular flange on a side opposite the end of said male tube, said male block having a second aperture formed therein; and
  fastening means for securely holding said male block and said component block adjacent one another to engage said male tube and the inner se of said component block.

16. The fitting according to claim 15, wherein said fastening means is a threaded stud having a first end and a second end, the first end of the stud threadingly engaging the second apse of said component block, the second end of the stud being inserted through the second aperture of said male block and having a nut thready disposed thereon.

17. The fitting according to claim 15, wherein there is a press fit between a wall forming the aperture of said male block and the outer wall of said male tube.

18. The fitting according to claim 15, wherein said first o-ring provides both an axial seal and a radial seal between said male tube and the inner surface of said component block.

19. The fitting according to claim 15, wherein an inner diameter of said male tube within said male block and said component block is substantially the same as an inner diameter of said male tube outside of said male block and said component block.

* * * * *